US012661687B2

(12) United States Patent
Toda

(10) Patent No.: US 12,661,687 B2
(45) Date of Patent: Jun. 23, 2026

(54) FILM FORMING METHOD AND FILM FORMING APPARATUS

(71) Applicant: Naohiro Toda, Kanagawa (JP)

(72) Inventor: Naohiro Toda, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 199 days.

(21) Appl. No.: 17/667,537

(22) Filed: Feb. 9, 2022

(65) Prior Publication Data

US 2022/0266294 A1 Aug. 25, 2022

(30) Foreign Application Priority Data

Feb. 12, 2021 (JP) ................................ 2021-021105

(51) Int. Cl.
*B05D 1/12* (2006.01)
*B05C 5/02* (2006.01)

(52) U.S. Cl.
CPC ................ *B05D 1/12* (2013.01); *B05C 5/027* (2013.01)

(58) Field of Classification Search
CPC . B05D 1/12; B05D 1/26; B05C 5/027; B41M 5/0047
See application file for complete search history.

(56) References Cited

U.S. PATENT DOCUMENTS 5,865,860 A * 2/1999 Delnick ..................... B41J 2/01 29/623.5
2005/0137281 A1* 6/2005 Voss-Kehl ............. H01B 3/448 524/413
2005/0255249 A1 11/2005 Schlatterbeck et al.
2006/0119669 A1* 6/2006 Sharma .................. H05K 3/125 347/82
2010/0129542 A1 5/2010 Weingartner
2011/0127462 A1* 6/2011 Choi ....................... H01M 4/48 252/182.1
2012/0281043 A1 11/2012 Hudd et al.
2019/0054494 A1* 2/2019 Noda ....................... B05D 1/26

FOREIGN PATENT DOCUMENTS

EP 1 561 788 B1 10/2007
JP 2003-275663 9/2003
JP 2004174981 A * 6/2004
JP 2005-185978 A 7/2005
JP 2008049572 A * 3/2008
JP 4336885 B2 * 9/2009
(Continued)

OTHER PUBLICATIONS

Office Action issued Feb. 1, 2024 in European Patent Application No. 22 155 657.4, 7 pages.
(Continued)

*Primary Examiner* — Nathan H Empie
(74) *Attorney, Agent, or Firm* — XSENSUS LLP

(57) ABSTRACT

A film forming method for forming a film on a target coating material includes coating a target coating material by discharging liquid from each of a plurality of discharge heads that are arranged in a conveyance direction of the target coating material to be conveyed, wherein the liquid discharged from each of the plurality of discharge heads is applied to a different location on the target coating material in the conveyance direction.

9 Claims, 10 Drawing Sheets

(56) References Cited

FOREIGN PATENT DOCUMENTS

| | | | | |
|---|---|---|---|---|
| JP | 2011222689 | A | * | 11/2011 |
| JP | 2014064966 | A | * | 4/2014 |
| JP | 2016-022682 | | | 2/2016 |
| JP | 2017-069199 | A | | 4/2017 |
| RU | 2 553 964 | C2 | | 6/2015 |

OTHER PUBLICATIONS

Extended European Search Report issued Jun. 13, 2022, in corresponding European Patent Application No. 22155657.4.
Office Action issued Nov. 26, 2024 in Japanese Patent Application No. 2021-021105, 11 pages.

* cited by examiner

FILM FORMING METHOD AND FILM FORMING APPARATUS

CROSS-REFERENCE TO RELATED APPLICATION

The present application is based on and claims priority under 35 U.S.C. § 119 to Japanese Patent Application No. 2021-021105, filed on Feb. 12, 2021, the contents of which are incorporated herein by reference in its entirety.

BACKGROUND OF THE INVENTION

The present disclosure relates to a film forming method and a film forming apparatus.

DESCRIPTION OF RELATED ART

Film forming methods by which a film is formed on a target coating material are known.

An application method for applying a coating liquid onto a substrate, wherein multiple inkjet heads are provided in a conveyance direction of the substrate, and droplets of the coating liquid are discharged in multiple stages (see Patent Document 1, for example) is disclosed.

CITATION LIST

Patent Literature

[Patent Document 1] Japanese Unexamined Patent Application Publication No. 2003-275663

SUMMARY OF THE INVENTION

A film forming method for forming a film on a target coating material according to one aspect of the present disclosure includes coating a target coating material by discharging liquid from each of a plurality of discharge heads that are arranged in a conveyance direction of the target coating material to be conveyed, wherein the liquid discharged from each of the plurality of discharge heads is applied to a different location on the target coating material in the conveyance direction.

DESCRIPTION OF THE EMBODIMENTS

Figure 1:
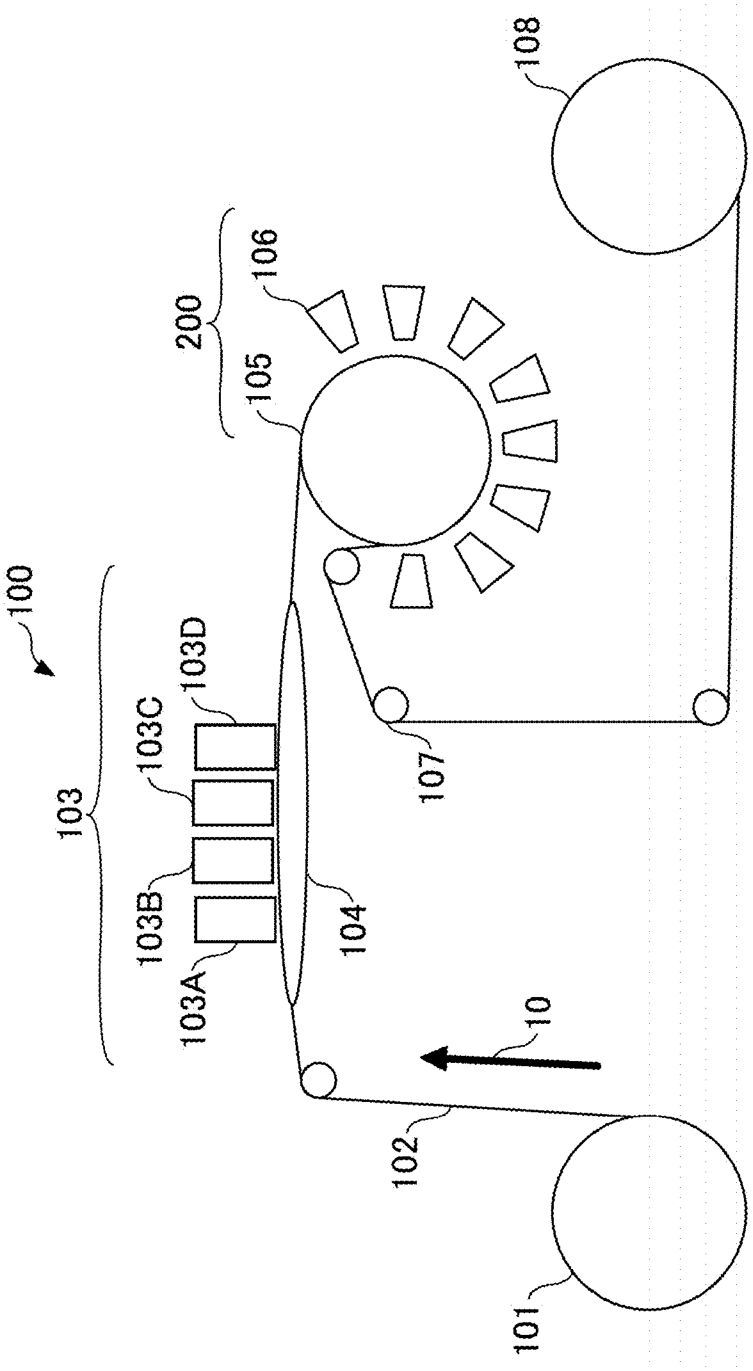
FIG. 1 is a drawing illustrating a configuration example of a film forming apparatus according to an embodiment.

There may be a need to improve uniformity of a film that is to be formed.

According to the present disclosure, uniformity of a film to be formed can be improved.

Hereinafter, modes for carrying out the invention are described with reference to the drawings. In the drawings, the same constituent elements are denoted with the same reference numerals, and duplicate expressions thereabout are omitted as appropriate.

Further, the embodiments described below are examples of a film forming method and a film forming apparatus for embodying the technical concept of the present disclosure, and the present disclosure is not limited to the embodiments described below. Unless otherwise specified, the dimensions, materials, shapes, relative arrangements thereof, are not intended to limit the subject matter of the present disclosure to only those described below, and instead are merely intended to indicate examples. Also, the sizes, the arrangements of the members illustrated in the drawings may be exaggerated to clarify the description.

The film forming method according to the embodiment is a technique for forming a film on a target coating material. It is to be noted that the film is not particularly limited as long as the structure is formed as a layer with respect to the target coating material. The target coating material includes an electrode substrate (current collector) to be used for storage devices such as batteries, power generation devices such as fuel cells, photovoltaic generation devices, and the like, and includes an electrode in which an electrode material layer such as active material is formed on the electrode substrate. In the film forming method, a liquid with materials including powdery active material and a catalytic composition dispersed therein is applied onto a target coating material, fixed, and then dried. By doing so, an electrode or the like having a film containing the various materials can be formed on the target coating material.

Examples for the method of forming a film by applying a liquid onto a target coating material include printing or the like with use of a sprayer, a dispenser, a die coater, or dip coating; or with use of inkjet heads.

However, there is a trade-off relationship between the productivity of the aforementioned devices and quality, and thus as productivity is increased in order to meet the demands brought on by market expansion, there is a possibility that defects will increase resulting in a decrease in the quality producible by the device.

For example, if defects that occur on the electrode surface, the electrode end face, or the electrode interface are left unresolved, through the passage of time or vibration when such products are shipped for sale in the marketplace, accumulation of certain materials in the defective region, short circuiting caused by a mechanical collision against the electrode interface, leaks, or the like might occur, and this can cause a device to catch fire or can reduce the product life of the device.

Also, when liquid is applied onto a target coating material in which a layer whose main component is particles is provided as the topmost layer of a non-permeable substrate, substantially round defects (point defects) where ink is absent on the target coating material tend to occur, compared to a structure on which a layer whose main constituent is resin is provided. The non-permeable substrate includes, for example, an active material of a battery or the like, and the layer whose main component is particles and is provided on the non-permeable substrate includes, for example, a graphite layer or the like.

It is conceivable that this phenomenon occurs, when liquid is applied onto the target coating material, due to the air inside the layer with particles as the main component in the target coating material being replaced by liquid and being discharged from the layer, resulting in the air remaining in the liquid on the target coating material. When target coating material containing substantially round defects is used as an electrode, this can cause a short circuit.

In the embodiments, a coating step is performed in which liquid discharged from each of the discharge heads arranged in a conveyance direction in which the target coating material is to be conveyed. Also, in the coating step, a liquid discharged from each of the discharge heads is applied to a different location on the target coating material in the conveyance direction.

Here, different location means that the location where the liquid is substantially applied onto the target coating material from each of the discharge heads is different for each of the discharge heads.

By applying liquid discharged by each of the discharge heads to a different location on the target coating material in the conveyance direction, the liquid can be applied intermittently to the target coating material, thereby ensuring that there is sufficient time for the air inside the layer with particles as the main component to be replaced by liquid and discharged therefrom. By doing so, substantially round defects and the like in the target coating material whose main component is particles can be substantially prevented, and thus uniformity of the film that is formed can be improved.

Next, the film forming method and the film forming apparatus according to the embodiments are described in detail.

Embodiments

Configuration Example of Film Forming Apparatus 100

First, the configuration of a film forming apparatus according to the embodiments is described. FIG. 1 is a diagram for describing an example of the configuration of the film forming apparatus 100. FIG. 1 schematically illustrates the inside of the film forming apparatus 100 as viewed through the film forming apparatus 100 in a direction substantially perpendicular to the conveyance direction 10 of a target coating material 102.

As illustrated in FIG. 1, the film forming apparatus 100 includes an unwinder 101, an inkjet head 103, a platen 104, a heat drum 105, a hot-air dryer 106, a conveyance roller 107, and a winder 108. These components are provided in order from upstream to downstream in the conveyance direction 10 of the target coating material 102.

The film forming apparatus 100 is an apparatus that evenly forms an ink-based film on the target coating material 102 by applying ink discharged from the inkjet head 103 onto the target coating material 102 as the target coating material 102 is being conveyed by the unwinder 101 and the winder 108. Next, each of the components of the film forming apparatus 100 are described in detail.

(Unwinder and Winder)

In the present embodiment, the unwinder 101 is used as the unwinding means of the target coating material 102, whereas the winder 108 is used as the winding means of the target coating material 102. The unwinder 101 rotates the target coating material 102 stored in a roll shape to supply the target coating material 102 to the conveyance path of the film forming apparatus 100.

The winder 108 rolls up the target coating material 102 on which the film was formed by application of ink into a roll shape for purpose of storage.

(Conveying Means)

The platen 104 guides the target coating material 102 such that the target coating material 102 is conveyed along the conveyance path. In addition to the conveyance roller 107, conveyance rollers and the like to which reference numbers have not been assigned are also used as the conveying means. The conveying means, the unwinding means, and the winding means constitute the conveying means of the target coating material 102.

Pertaining to other steps as well, the application speed in the film forming apparatus 100 is preferably 30 m/min to 100 m/min. This may also be used suitably in cases where high-speed film formation is required.

The target coating material 102 is a substrate that is continuous in the conveyance direction 10. The film forming apparatus 100 conveys the target coating material 102 along the conveyance path between the unwinder 101 and the winder 108. Also, the length of the target coating material 102 in the conveyance direction 10 is at least longer than the conveyance path between the unwinder 101 and the winder 108. The film forming apparatus 100 is configured to continuously execute film formation with respect to the target coating material 102 that is continuous in the conveyance direction 10.

(Ink)

The ink constitutes the liquid that achieves the function of the film and is an example of liquid that is discharged from each of the inkjet heads. The liquid is not particularly limited as long as the liquid has a viscosity and a surface tension that enable the liquid to be discharged from the inkjet heads. The liquid preferably has a viscosity of 30 mPa·s or less at a standard temperature under a standard pressure, or even when being heated or cooled.

More specifically, examples of the liquids include a solution, a suspension, an emulsion, and the like, the solution containing: water; a solvent such as an organic solvent; a pigment; a dye; a polymerizable compound; a resin; a functionality-imparting material such as a surfactant; a biocompatible material such as DNA, an amino acid, a protein, or calcium; an edible material such as a natural pigment; or the like. The above-described liquids can be used, for example, for inkjet ink; a surface treatment liquid; a liquid for forming various devices such as a component such as an electronic element or a light emitting element, or a resist pattern for an electronic circuit; or the like.

Moreover, since it is particularly difficult to form a uniform film in a case where there is a large amount of non-volatile components in the ink or in a case where ink having metal oxide particles as the main component is used, the present embodiment is especially effective.

(Liquid Application Means)

The liquid application means is means for applying ink onto the target coating material 102 by discharging ink. The film forming apparatus 100, as illustrated in FIG. 1, includes the inkjet head 103 as the liquid application means.

The inkjet head 103 of the film forming apparatus 100 includes inkjet heads 103A, 103B, 103C, and 103D in the conveyance direction 10 of the target coating material 102. It is to be noted that this is not limited thereto. The film forming apparatus 100 can be provided with two or more inkjet heads in the conveyance direction 10. It is to be noted that the inkjet heads 103A, 103B, 103C, and 103D have the same configurations and if inkjet heads 103A, 103B, 103C, and 103D are not particularly distinguished, they are simply referred to as the inkjet head 103 as a collective notation.

The inkjet head 103 has multiple nozzle arrays in which multiple nozzles are arranged along the target coating material 102 in the widthwise direction (the direction intersecting the conveyance direction 10). The film forming apparatus 100 is provided with an ink jet 103 such that the discharge direction of ink from the nozzles is oriented at the target coating material 102. Also, the inkjet heads 103A, 103B, 103C, and 103D are an example of discharge heads that are provided in the conveyance direction 10 of the target coating material 102 that is to be conveyed.

The inkjet head 103 is a line-type inkjet head. The "line-type inkjet head" is an inkjet head with nozzles that discharge ink along the entire width of the target coating material 102 in the widthwise direction. It is to be noted that the width of the inkjet head 103 is not necessarily equal to the entire width of the target coating material 102 in the widthwise direction, and thus the width may be suitably set.

In industrial applications, since film forming is performed at a high-speed on a large amount of target coating material, an inkjet system employing line-type inkjet heads as illustrated in FIG. 1 is preferable. In the industrial applications, however, since film forming is performed continuously for a long period of time, in cases where line-type heads are used, some of the nozzles do not discharge ink for a long period of time due to the shape of the film. In these nozzles, there are cases were a discharge abnormality occurs when ink components become non-uniform in the ink due to drying of the ink in the nozzle or due to settling of particle components in the ink.

Therefore, in the ink application step, it is preferable to vibrate the interface of ink inside the nozzles and regularly circulate the ink in discharge heads in nozzles that are not discharging ink. By vibrating the interface of the ink inside the nozzle and regularly circulating the ink in the discharge head, the ink in the nozzle and the ink in the ink passage in the inkjet head of the pressure chambers and the like connected to the nozzles can be kept in a uniform state, and thus non-uniformity of ink in the nozzle can be substantially prevented. By doing so, the occurrence of irregular film generation caused by a discharge abnormality can be substantially prevented. The interface inside the nozzle is an interface where the ink is in contact with the atmosphere or gas.

Means for applying a stimulus to the ink thereby allowing the ink to be discharged in the inkjet head 103 can be suitably selected in accordance with the purpose. For example, a pressurizing apparatus, a piezoelectric element, a vibration-generating apparatus, an ultrasonic wave oscillator, a light, or the like can be used. Specific examples include a piezoelectric actuator such as a piezoelectric element, a shape memory alloy actuator using a metal phase transition due to change in temperature, and a static actuator using an electrostatic force, and the like.

Among them, particularly preferable is a component that applies a voltage to a piezoelectric element affixed to a location referred to as a pressure chamber (also referred to as a liquid chamber and the like) inside the ink passage that is inside the inkjet head 103. The piezoelectric element is deflected by the application of voltage and the pressure chamber is decreased in volume, thereby increasing pressure of ink in the pressure chamber and causing the ink to be discharged as droplets from the nozzle of this inkjet head 103.

The inkjet head 103 includes an inkjet discharging unit. The inkjet discharging unit is an assembly of mechanisms and functional components related to the discharge of ink from the inkjet head 103. The inkjet discharging units include a combination of the inkjet head 103 and at least one of a supply mechanism, a maintenance recovery mechanism, or a liquid discharge head conveyance mechanism.

(Target Coating Material)

A structure in which a layer with particles as the main component is provided on a non-permeable substrate such as a metal sheet can be used as the target coating material 102. The layer with particles as the main component provided on the non-permeable substrate is, for example, a layer with graphite as the main component.

Examples of the non-permeable substrate include a metal sheet including, for example, aluminum, aluminum oxide, copper, stainless steel, nickel, platinum, or may include a resin film such as a polypropylene film, polyethylene terephthalate film, or a nylon film.

(Drying Means)

The drying means is means for drying the ink on the target coating material 102 after the ink is discharged. In FIG. 1, the heat drum 105 and the hot-air dryer 106 are included in drying means 200.

The heat drum 105 is a rotatable drum. The heat drum 105 is an example of a temperature adjusting member for heating or cooling the conveyed target coating material 102 coated with ink by bringing the target coating material 102 into contact with the outer peripheral surface thereof.

The heat adjustment method by the heat drum 105 is: a method of, for example, heating or cooling the target coating material 102 by the heat drum 105 filled with liquid or gas serving as a heat-exchange medium, a method in which a heat source is provided inside the heat drum 105, or the like. The drying means 200 uses the liquid or gas, with which the inside of the heat drum 105 is filled, as the heat-exchange medium, and circulates the liquid or gas between the drying means 200 and an external apparatus such as a chiller provided on the outside of the heat drum 105, thereby maintaining the heat-exchange medium at a desired temperature. The drying means 200 heats or cools the target coating material 102 by heat exchange with this heat exchange medium.

The liquid that is passed through the inside the heat drum 105 is not particularly limited as long as the liquid has flowability such as water or oil. Water, being easy to handle, is preferable as the liquid. In terms of cost and safety, it is preferable to use heated air as the gas that is passed through the heat drum 105.

The drying means 200 sucks into the inside of the heat drum 105 or exhausts to the outside, via valves provided on both ends (ends in a direction perpendicular to the conveyance direction 10) of the heat drum 105, liquid or gas circulated between the drying means 200 and an external device such as a chiller.

Also, the method in which the heat source device is provided in the heat drum 105 includes a halogen heater, an infrared heater, a nichrome heater, or the like as the heat source device.

The hot-air dryer 106 includes nozzles provided such that the nozzles face the peripheral surface of the heat drum 105, the nozzles extending in the widthwise direction and having respective openings. The hot-air dryer 106 blows air from the nozzles onto the target coating material 102 wound around the heat drum 105 to heat the target coating material 102, thereby drying the ink on the target coating material 102. An infrared heater may be provided instead of the hot-air dryer 106 or in addition to the hot-air dryer 106, and the infrared heater can also dry the ink on the target coating material 102 by emitting infrared rays onto the surface of the target coating material 102.

The power consumption required for drying can be reduced by adjusting the temperature of the heat drum 105, the hot-air temperature of the hot-air dryer 106, the air speed of the air blown by the hot-air dryer 106 within appropriate ranges in accordance with the drying property of the solvent used as the ink and in accordance with the damage otherwise inflicted on the target coating material to be used.

Example of Film Coating Method by Film Forming Apparatus 100

Next, the film forming method by the film forming apparatus 100 is described. During the film forming by the film forming apparatus 100, the inkjet heads 103A, 103B, 103C, and 103D provided in the conveyance direction 10 sequentially discharge the same type of ink to apply ink to the target coating material 102. Also, the ink discharged from each of the inkjet heads 103A, 103B, 103C, and 103D is applied to a different location on the target coating material 102 in the conveyance direction 10.

Figure 2:
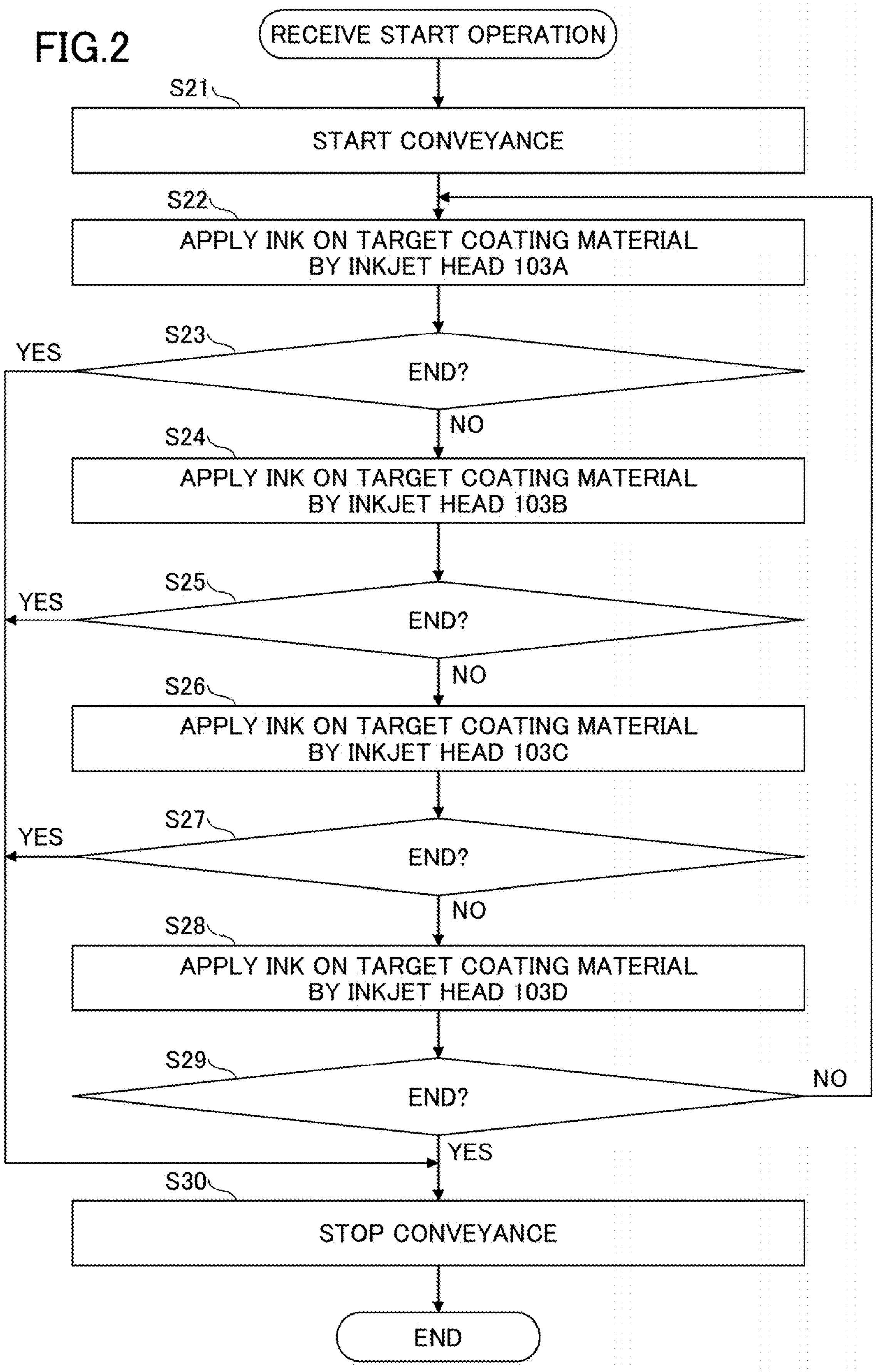
FIG. 2 is flowchart illustrating an operation example of the film forming apparatus according to the embodiment.

FIG. 2 is a flowchart illustrating an operation example of the film forming apparatus 100. FIG. 2 illustrates an operation that is started upon the film forming apparatus 100 receiving an operation that is performed by the user with respect to the operation unit of the film forming apparatus 100.

First, in step S21, the film forming apparatus 100 starts conveyance of the target coating material 102 by causing the unwinder 101 to start unwinding the target coating material 102 and causing the winder 108 to start winding the target coating material 102.

Next, in step S22, the inkjet head 103A discharges ink from all of the nozzles concurrently onto the target coating material 102 that is conveyed, and then after the target coating material 102 is conveyed by a predetermined distance, the inkjet head 103A stops discharging ink by all of the nozzles. By doing so, the inkjet head 103A applies ink to a region of the target coating material 102 corresponding to both a predetermined distance in the conveyance direction 10 and the total width in the widthwise direction.

Next, in step S23, the film forming apparatus 100 determines whether film formation is completed. The film forming apparatus 100 determines whether the film formation is completed by: determining whether a predetermined completion condition is satisfied; determining whether the film forming apparatus 100 has received a completion operation performed by the operator via the operation unit; or the like. The same applies to the completion determination described below.

In a case where a determination is made that film formation is completed in step S23 (YES in step S23), the operation proceeds to step S30. Conversely, in a case where a determination is made that film formation is not completed (NO in step S23), the operation proceeds to step S24.

Next, in step S24, the inkjet head 103B discharges ink from all of the nozzles concurrently onto the target coating material 102 that is conveyed, and then after the target coating material 102 is conveyed by a predetermined distance, the inkjet head 103B stops discharging ink by all of the nozzles. By doing so, the inkjet head 103B applies ink to a region of the target coating material 102 corresponding to both the predetermined distance in the conveyance direction 10 and the total width in the widthwise direction, on the downstream side of the region where the inkjet head 103A applied ink in the conveyance direction 10.

Since the inkjet head 103B applies ink to a location different from that of the inkjet head 103A in the conveyance direction 10, the ink is applied intermittently to the target coating material 102 rather than continuously. The inkjet head 103B applies ink without any gap with respect to the region where the inkjet head 103A applied ink.

Also, the inkjet head 103B applies ink to the target coating material 102 such that the area of the region where the inkjet head 103B applies ink is substantially equal in size to the area of the region where the inkjet head 103A applied ink.

Next, in step S25, the film forming apparatus 100 determines whether film formation is completed.

In a case where a determination is made that film formation is completed in step S25 (YES in step S25), the operation transitions to step S30. Conversely, in a case where a determination is made that film formation is not completed (NO in step S25), the operation transitions to step S26.

Next, in step S26, the inkjet head 103C discharges ink from all of the nozzles concurrently onto the target coating material 102 that is conveyed, and then after the target coating material 102 is conveyed by a predetermined distance, the inkjet head 103C stops discharging ink by all of the nozzles. By doing so, the inkjet head 103C applies ink to a region of the target coating material 102 corresponding to both a predetermined distance in the conveyance direction 10 and the total width in the widthwise direction, on the downstream side of the region where the inkjet head 103B applied ink in the conveyance direction 10.

Since the inkjet head 103C applies ink to a location different from that of the inkjet head 103B in the conveyance direction 10, the ink is applied intermittently to the target coating material 102 rather than continuously. The inkjet head 103C applies ink without any gap with respect to the region where the inkjet head 103B applied ink.

Also, the inkjet head 103C applies ink to the target coating material 102 such that the area of the region where the inkjet head 103C applies ink is substantially equal to the area of the region where the inkjet head 103B applied ink.

Next, in step S27, the film forming apparatus 100 determines whether film formation is completed.

In a case where a determination is made that the film forming is completed in step S27 (YES in step S27), the operation transitions to step S30. Conversely, in a case where a determination is made that film formation is not completed (NO in step S27), the operation transitions to step S28.

Next, in step S28, the inkjet head 103D discharges ink from all of the nozzles concurrently onto the target coating material 102 that is conveyed, and then after the target coating material 102 is conveyed by a predetermined distance, the inkjet head 103D stops discharging ink by all of the nozzles. By doing so, the inkjet head 103D applies ink to a region of the target coating material 102 corresponding to both the predetermined distance in the conveyance direction 10 and the total width in the widthwise direction, the region being on the downstream side of the region where the inkjet head 103C applied ink in the conveyance direction 10.

Since the inkjet head 103D applies ink to a location different from that of the inkjet head 103C in the conveyance direction 10, the ink is applied intermittently to the target coating material 102 rather than continuously. The inkjet head 103D applies ink without any gap with respect to the region where the inkjet head 103C applied ink.

Also, the inkjet head 103D applies ink to the target coating material 102 such that the area of the region where the inkjet head 103D applies ink is substantially equal to the area of the region where the inkjet head 103C applied ink.

Next, in step S29, the film forming apparatus 100 determines whether film formation is completed.

In a case where a determination is made that the film formation is completed in step S29 (YES in step S29), the operation transitions to step S30. Conversely, if a determination is made that the film formation is not completed (NO in step S29), the operation returns to step S22, and the operations of step S22 and subsequent steps are performed again.

Next, in step S30, the film forming apparatus 100 stops conveyance of the target coating material 102 by causing the unwinder 101 to stop unwinding the target coating material 102 and causing the winder 108 to stop winding the target coating material 102.

By doing so, the film forming apparatus 100 can apply ink to the target coating material 102.

Example of a Result of Film Formation by Film Forming Apparatus 100

Figure 3:
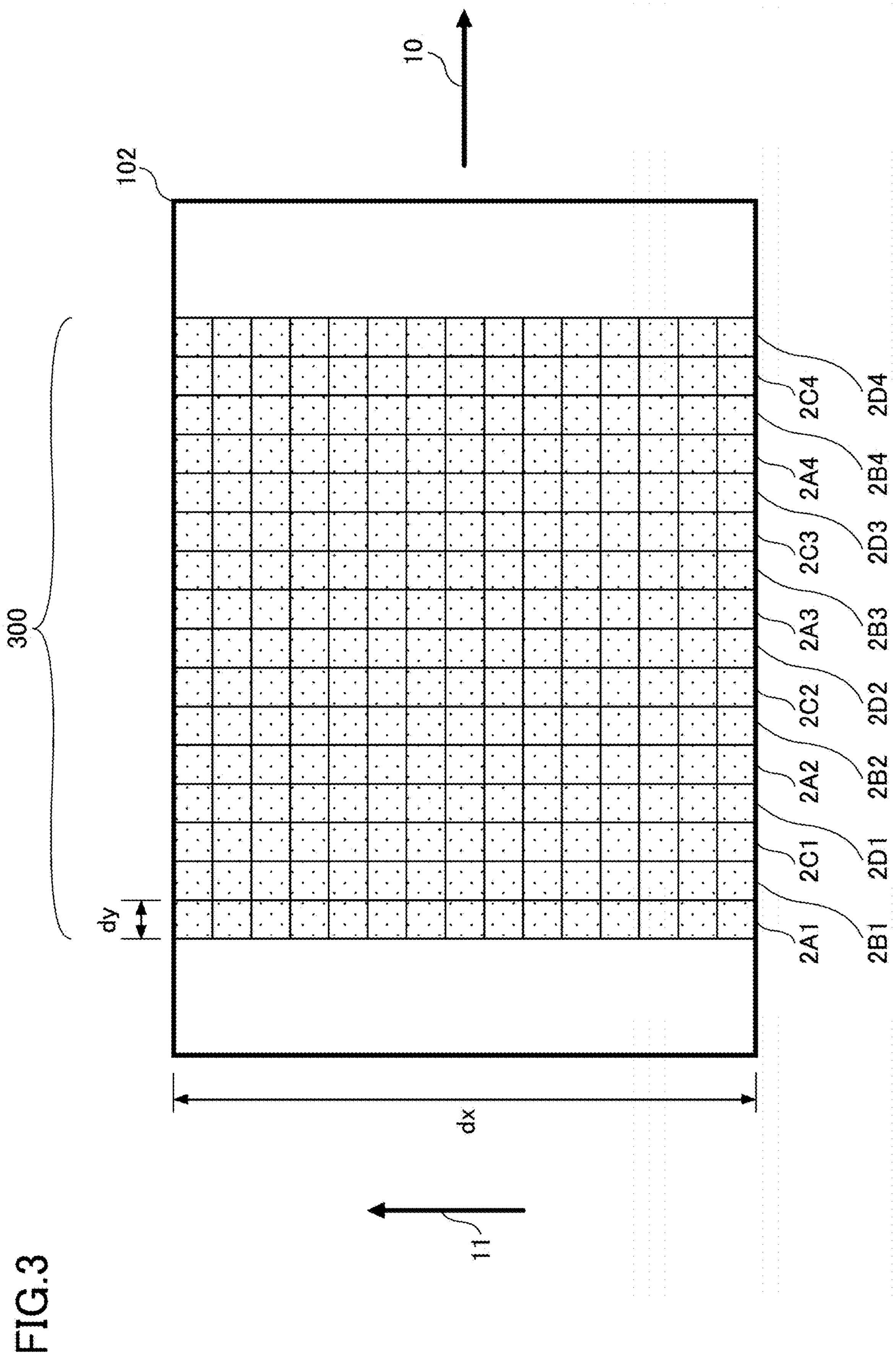
FIG. 3 is a drawing illustrating a film formed by the film forming apparatus according to the embodiment.

Next, a result of film formation by the film forming apparatus 100 is described. FIG. 3 is a diagram illustrating an example of a result of film formation of a film 300 by the film forming apparatus 100. FIG. 3 is a top view of target coating material 102 on which the film 300 is formed. The film 300 is formed (affixed) on the target coating material 102 when the ink, which is discharged from the inkjet head 103 and applied on the target coating material 102, is dried by the drying means 200.

A region 2A1 illustrates a region of the film formed by ink that is applied by the inkjet head 103A. A distance dy corresponds to the aforementioned predetermined distance in the conveyance direction 10, whereas distance dx corresponds to the total width in the widthwise direction 11. The area of the region 2A1 is the product of the distance dx and the distance dy.

In the region 2A1, the squares arrayed in the widthwise direction 11 represent a region of film formed by ink discharged by each of the nozzles included in the inkjet head 103A, the nozzles being arrayed in the widthwise direction 11. The region of this film can also be referred to as the pixel region. It is to be noted that the droplets of ink discharged from each of the nozzles onto the target coating material 102 is substantially round, and the area of each droplet is greater than the area of each square, and thus one square is not formed by the droplet of ink discharged from one nozzle. The film is formed by ink such that the center of the circle formed by the droplet of ink and the center of the square substantially coincide with each other.

Likewise, a region 2B1 illustrates a region of film formed by ink applied by the inkjet head 103B. A region 2C1 illustrates a region of film formed by ink applied by the inkjet head 103C. A region 2D1 illustrates a region of film formed by ink applied by the inkjet head 103D.

Each of the regions 2A1, 2B1, 2C1, and 2D1 is arranged in a different location in the conveyance direction 10. The center location of the region 2A1 in the conveyance direction 10 substantially coincides with the center location of the ink that is applied on the target coating material 102 by the inkjet head 103A, whereas the center location of the region 2B1 in the conveyance direction 10 substantially coincides with the center location of the ink that is applied on the target coating material 102 by the inkjet head 103B. Also, the center location of the region 2C1 in the conveyance direction 10 substantially coincides with the center location of the ink that is applied on the target coating material 102 by the inkjet head 103C, whereas the center location of the region 2D1 in the conveyance direction 10 substantially coincides with the center location of the ink that is applied on the target coating material 102 by the inkjet head 103D.

Therefore, the ink discharged from each of the inkjet heads 103A, 103B, 103C, and 103D is applied to a different location on the target coating material 102 in the conveyance direction 10.

A region 2A2 illustrates a region of the film that is formed next by the inkjet head 103A by application of ink, after the formation of the region 2A1 by the inkjet head 103A.

Likewise, a region 2B2 illustrates a region of the film that is formed next by the inkjet head 103B by application of ink, after the formation of the region 2B1. A region 2C2 illustrates a region of the film that is formed next by the inkjet head 103C by application of ink, after the formation of the region 2C1. A region 2D2 illustrates a region of the film that is formed next by the inkjet head 103D by application of ink, after the formation of the region 2D1.

The regions 2A3 and 2A4, the regions 2B3 and 2B4, the regions 2C3 and 2C4, and the regions 2D3 and 2D4 likewise illustrate regions that are sequentially formed by the respective inkjet heads.

EXAMPLES

In the following, the embodiments are described in greater detail by presenting examples, comparative examples, and reference examples. Nevertheless, it is to be noted that the embodiments are not limited to these examples.

In FIGS. 4 through 10 described below, the region where the ink is discharged for application by the inkjet head 103A is referred to as a region 2A, the region where the ink is discharged for application by the inkjet head 103B is referred to as a region 2B, the region where the ink is discharged for application by the inkjet head 103C is referred to as a region 2C, and the region where the ink is discharged for application by the inkjet head 103D is referred to as a region 2D.

Ink Preparation Example 1

Ink 1 having 40% non-volatile components was prepared by performing ball mill dispersion on the following composition for 24 hours using zirconia media having a diameter of 2 mm.

[Composition]

Aluminum oxide particles AKP-3000 (Sumitomo Chemical Company Limited) at 177 parts High-molecular compound (a copolymer of ammonium fumarate and a monomer having a side chain having an oxyalkylene group or a polyoxyalkylene group) Malialim HKM-50A (NOF corporation) at 3 parts NMP at 270 parts

Ink Preparation Example 2

Ink 2 that is the same as the ink 1 except for the fact that the aluminum oxide particles AKP-3000 (Sumitomo Chemical Company Limited) in the composition of the Ink 1 was changed to titanium oxide particles PT-301M (Ishihara Sangyo Kaisha, Ltd.) was prepared.

Ink Preparation Example 3

Ink 3 having 30% non-volatile components was prepared by performing ball mill dispersion on the following composition for 24 hours using zirconia media having a diameter of 2 mm.

[Composition]

Aluminum oxide particles AKP-3000 (Sumitomo Chemical Company Limited) at 132.7 parts High-molecular compound (a copolymer of ammonium fumarate and a monomer having a side chain having an oxyalkylene group or a polyoxyalkylene group) Malialim HKM-50A (NOF corporation) at 2.3 parts NMP at 270 parts Ink Preparation Example 4

Ink 4 having 20% non-volatile components was prepared by performing ball mill dispersion on the following composition for 24 hours using zirconia media having a diameter of 2 mm.

[Composition]

Aluminum oxide particles AKP-3000 (Sumitomo Chemical Company Limited) at 88.5 parts High-molecular compound (a copolymer of ammonium fumarate and a monomer having a side chain having an oxyalkylene group or a polyoxyalkylene group) Malialim HKM-50A (NOF corporation) at 1.5 parts NMP at 270 parts Ink Preparation Example 5

Ink 5 having 10% non-volatile components was prepared by performing ball mill dispersion on the following composition for 24 hours using zirconia media having a diameter of 2 mm.

[Composition]

Aluminum oxide particles AKP-3000 (Sumitomo Chemical Company Limited) at 44.2 parts High-molecular compound (a copolymer of ammonium fumarate and a monomer having a side chain having an oxyalkylene group or a polyoxyalkylene group) Malialim HKM-50A (NOF corporation) at 0.8 parts NMP 270 parts Ink Preparation Example 6

Ink 6 having 40% non-volatile components was prepared by stirring and mixing the following composition with a stirrer.

[Composition]

Acrylic monomer Viscoat #295 (Osaka Organic Chemical Industry Ltd.) 171

Polymerization initiator (1-hydroxycyclohexylphenyl ketone) (Tokyo Chemical Industry Co., Ltd.) at 9 parts NMP at 270 parts Example 1

Each of the inks were added to the ink storage container in a modified version of an inkjet recording apparatus (product name: VC-60000; Ricoh Co., Ltd.) capable of being loaded with four types of inks, and then film was formed. The configuration of the modified version of the inkjet recording apparatus is the configuration illustrated in FIG. 1 in which each of the four inkjet heads 103A, 103B, 103C, and 103D discharges ink. Continuous film formation under the formation conditions described below was performed using the modified version of the inkjet recording apparatus.

Application Conditions

Application speed: 50 m/min.

Application time difference between inkjet heads: 0.5 sec.

Resolution: 1200 dpi×1200 dpi

Application film: Uniform solid coating film

Number of inkjet heads: Four inkjet heads 103A, 103B, 103C, and 103D are arranged in a line in the conveyance direction 10

Discharge method: Repeated ink application to regions each being uniformly divided into four by four inkjet heads 103A, 103B, 103C, and 103D (See FIG. 3)

Ink: Ink 1

Discharge droplet size 14 pl

Target coating material: A substrate of an electrode application for a battery where a 50 μm layer with graphite particles having an average particle diameter of 9 μm as the main component is provided on copper foil that is 10 μm Hot-air drying means: Hot air temperature 130° C., wind-speed 20 m/s Heat drum means: IR heater in drum 120° C.

(Evaluation)

After formation was performed under the conditions in above-described Example 1, the quality of the film was evaluated in accordance with the evaluation criteria and method described below.

Quality of Film

After cutting out a A4 size portion of the film, the quality of the film was inspected by the naked eye and also observed through a microscope, and evaluated using the following criteria. An evaluation of 3 or higher means that a determination was made that the film is of practical use.

(Evaluation Criteria)

5: No occurrence of defects by observation through a microscope

4: Although unconfirmable by the naked eye, three or less defects are confirmable by observation through a microscope 3: Although unconfirmable by the naked eye, ten or less defects are confirmable by observation through a microscope 2: Occurrence of defects along portions of the film are confirmable by the naked eye 1: Occurrence of defects along the entirety of the film are confirmable by the naked eye Example 2

Figure 4:
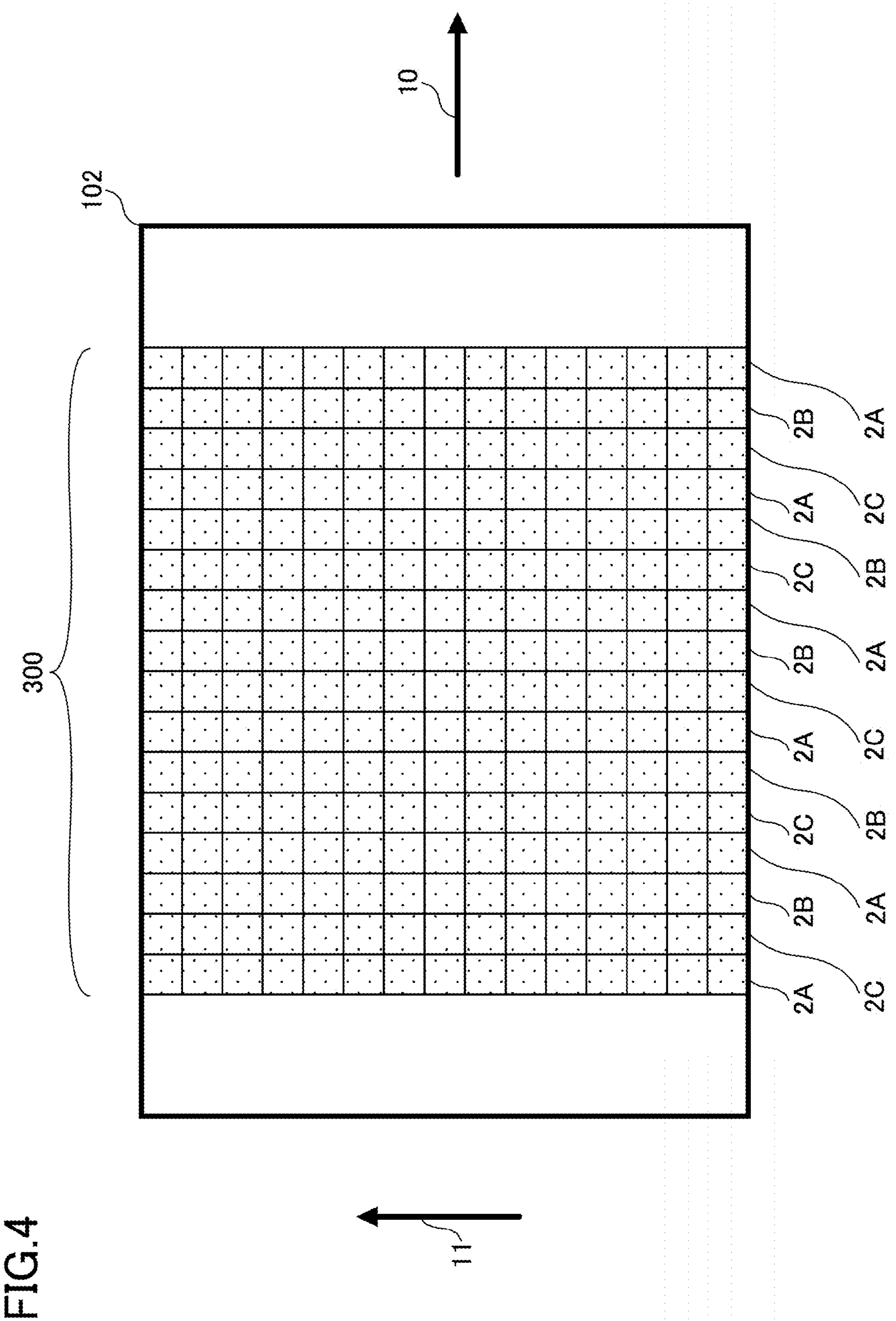
FIG. 4 is a drawing illustrating a film formed by the film forming apparatus according to Example 2.

Continuous film formation was performed under the same conditions as the formation conditions of Example 1 except for the fact that discharge method was changed such that only three inkjet heads among the four inkjet heads 103A, 103B, 103C, and 103D arranged in the conveyance direction were used to perform repeated application in regions each being uniformly divided into three by the three inkjet heads (see FIG. 4).

Example 3

Figure 5:
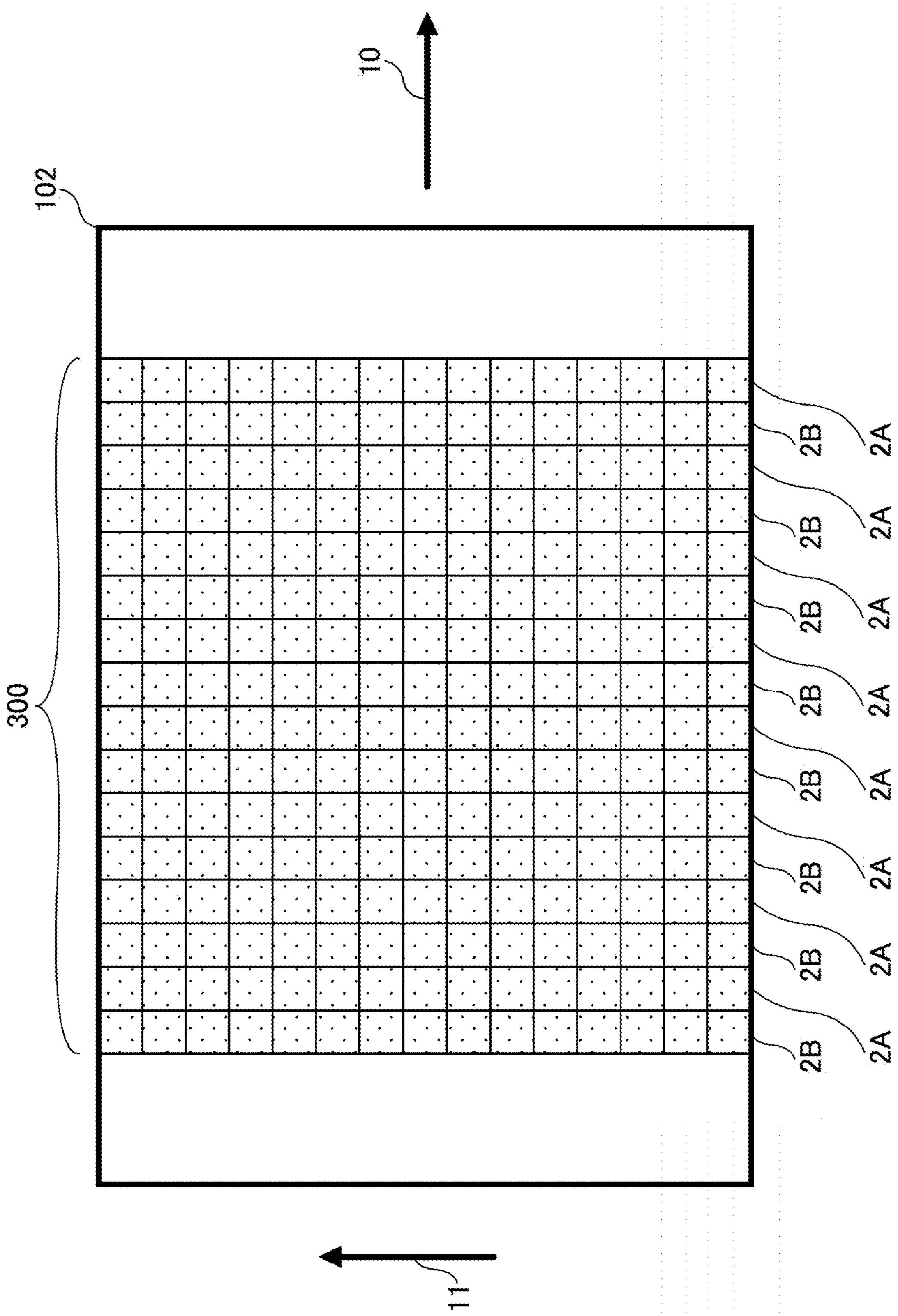
FIG. 5 is a drawing illustrating a film formed by the film forming apparatus according to Example 3.
Figure 6:
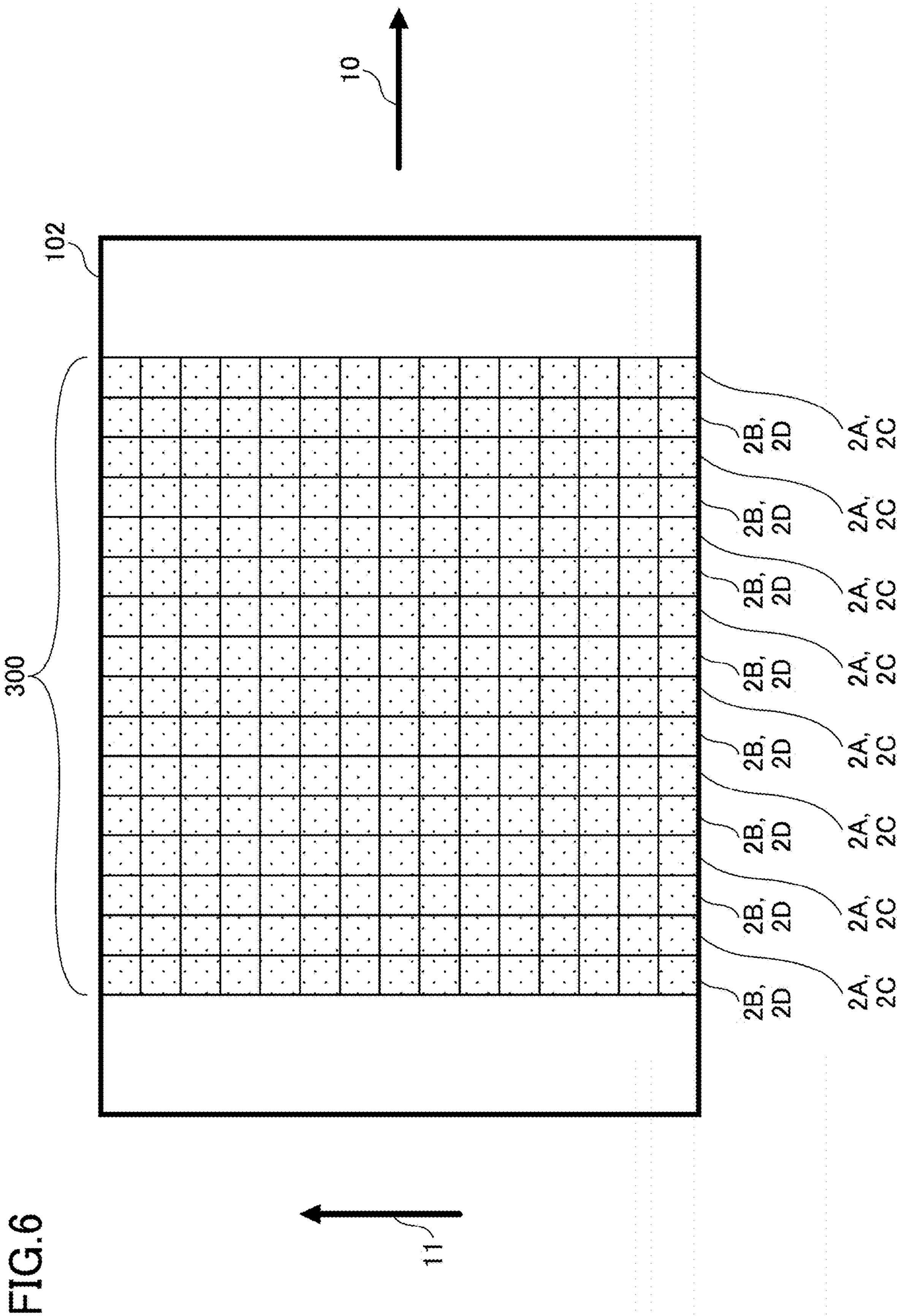
FIG. 6 is a drawing illustrating a film formed by the film forming apparatus according to Example 4.

Continuous film formation was performed under the same conditions as the formation conditions of Example 1 except for the fact that the discharge method was changed such that only two inkjet heads among the four inkjet heads 103A, 103B, 103C, and 103D arranged in the conveyance direction were used to perform repeated application in regions each being uniformly divided into two by the two inkjet heads (See FIG. 5).

Example 4

Continuous film formation was performed under the same conditions as the formation conditions of Example 1 except for the fact that the discharge method was changed such that ink application was repeated in regions each being uniformly divided into two by the four inkjet heads 103A, 103B, 103C and 103D (see FIG. 6), and that the droplet size discharged by each of the inkjet heads was changed from 14 [p1] to 7 [p1]).

Example 5

Figure 7:
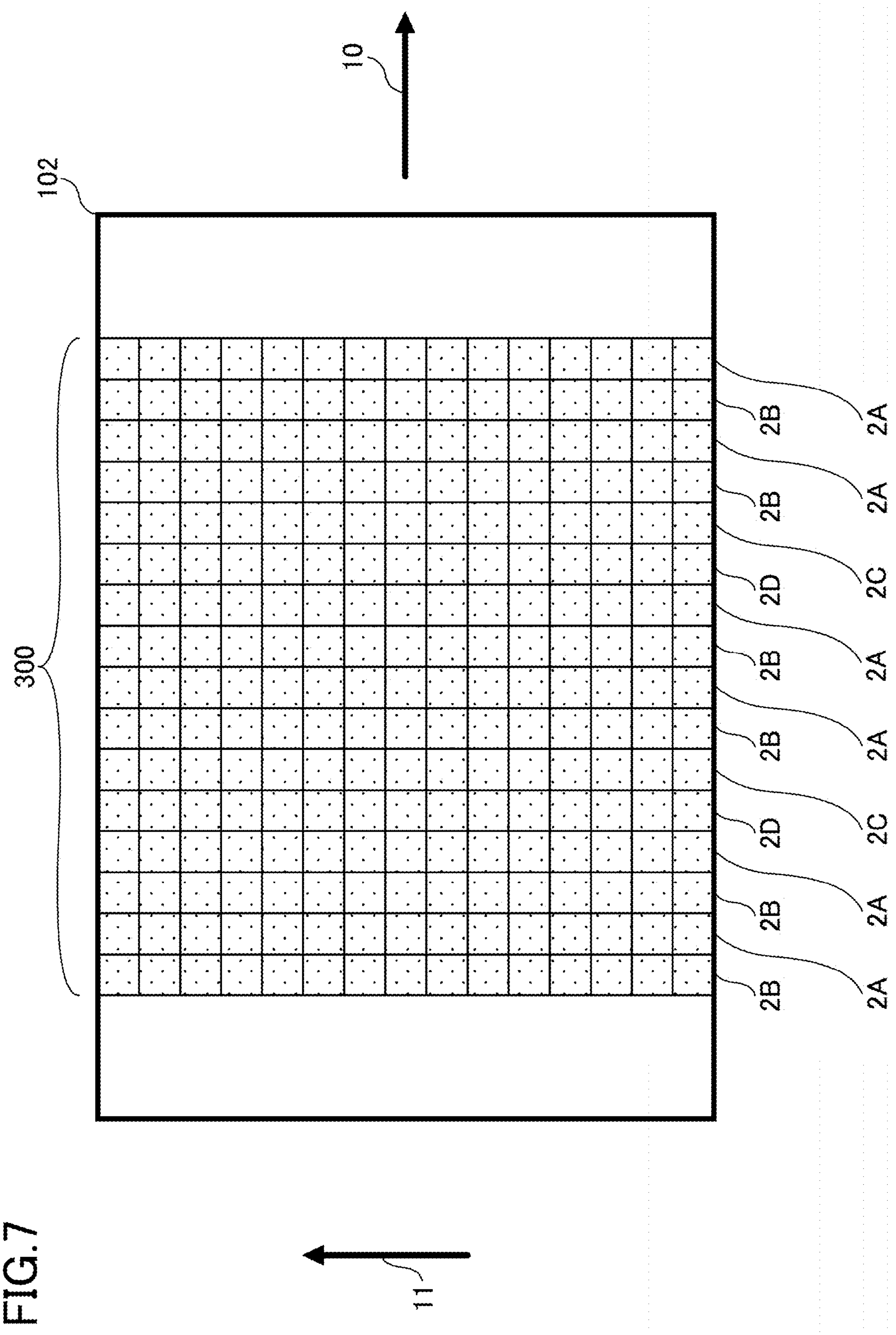
FIG. 7 is a drawing illustrating a film formed by the film forming apparatus according to Example 5.

Continuous film formation was performed under the same conditions as the formation conditions of Example 1 except for the fact that the discharge method was changed such that repeated application was performed in regions each being uniformly divided into six by the four inkjet heads 103A, 103B, 103C, and 103D (See FIG. 7).

Example 6

Figure 8:
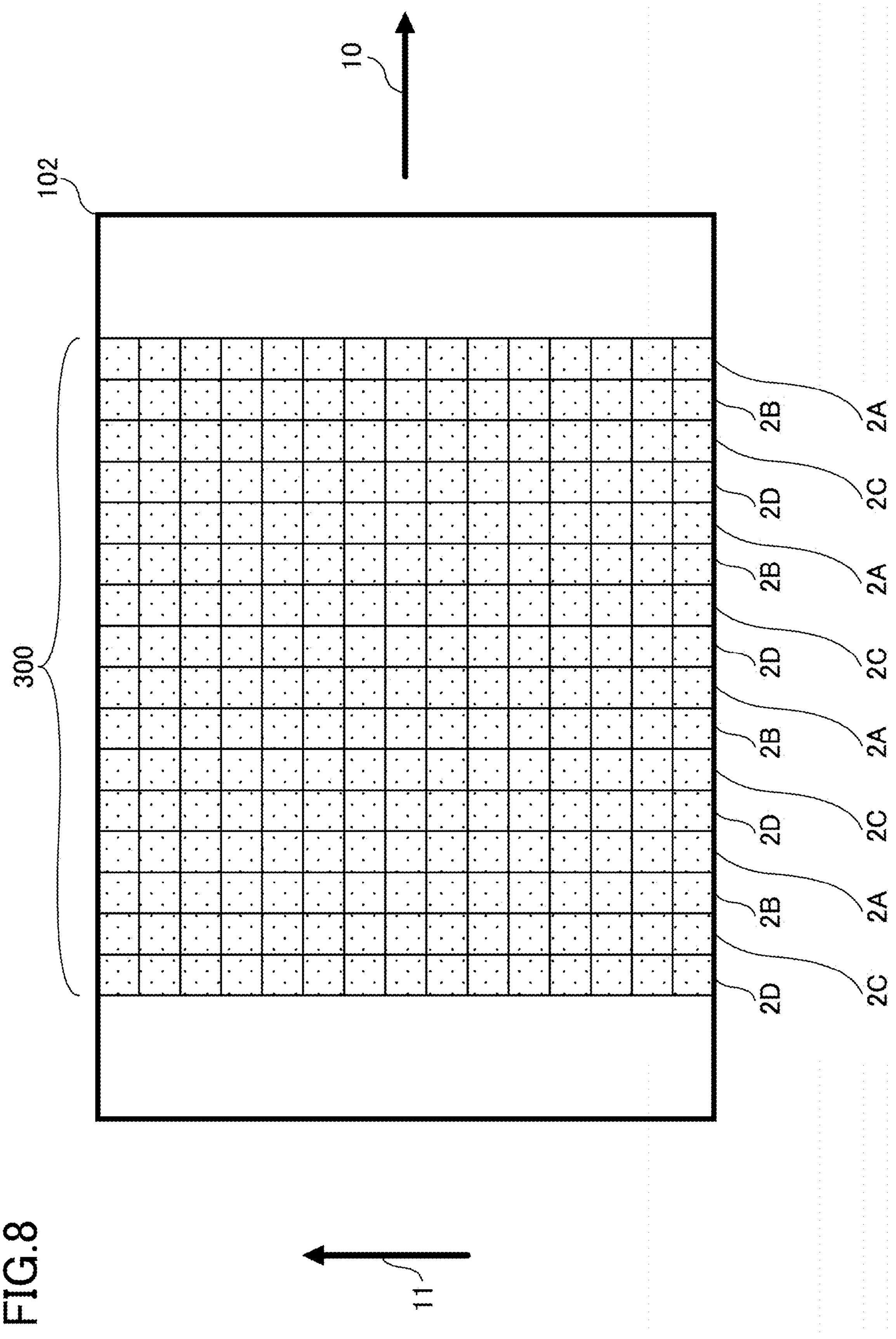
FIG. 8 is a drawing illustrating a film formed by the film forming apparatus according to Example 6.

Continuous film formation was performed under the same conditions as the formation conditions of Example 1 except for the fact that the discharge method was changed such that repeated application was performed in regions each being divided into six by the four inkjet heads 103A, 103B, 103C, and 103D (See FIG. 8).

Example 7

Continuous film formation was performed under the same conditions as the formation conditions of Example 1 except for the fact that the distance between the inkjet heads in the conveyance direction was changed such that the application time difference between inkjet heads changed from 0.5 sec to 0.4 sec.

Example 8

Continuous film formation was performed under the same conditions as the formation conditions of Example 1 except for the fact that the distance between the inkjet heads in the conveyance direction was changed such that the application time difference changed from 0.5 sec to 0.3 sec.

Example 9

Continuous film formation was performed under the same conditions as the formation conditions of Example 1 except for the fact that the distance between the inkjet heads in the conveyance direction was changed such that the application time difference changed from 0.5 sec to 0.2 sec.

Example 10

Continuous film formation was performed under the same conditions as the formation conditions of Example 1 except for the fact that the droplet size to be discharged by the inkjet heads were changed from the inkjet head 103A located furthest upstream through to the inkjet head 103D located furthest downstream as described below.

Inkjet head 103A: 8 [p1]
Inkjet head 103B: 12 [p1]
Inkjet head 103C: 16 [p1]
Inkjet head 103D: 20 [p1]

Example 11

Continuous film formation was performed under the same conditions as the formation conditions of Example 1 except for the fact that the ink used was changed from the ink 1 to ink 3.

Example 12

Continuous film formation was performed under the same conditions as the formation conditions of Example 1 except for the fact that the ink used was changed from the ink 1 to ink 2.

Comparative Example 1

Figure 9:
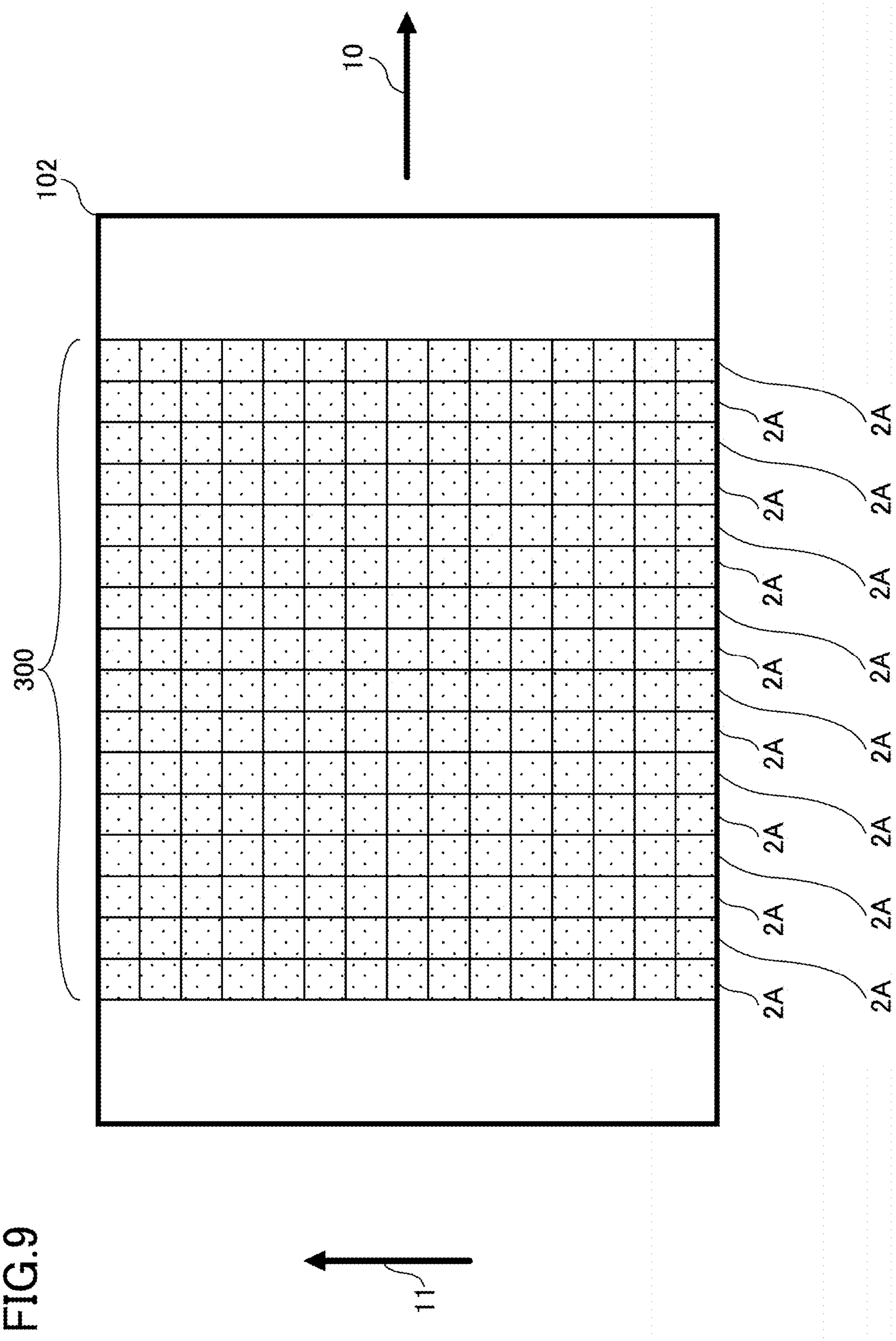
FIG. 9 is a drawing illustrating a film formed by the film forming apparatus according to Comparative Example 1.

Continuous film formation was performed under the same conditions as the formation conditions of Example 1 except for the fact that only one inkjet head was used among the four inkjet heads 103A, 103B, 103C, and 103D arranged in the conveyance direction and the ink was applied by the one inkjet head to each of the regions of the target coating material as illustrated in FIG. 9.

Comparative Example 2

Figure 10:
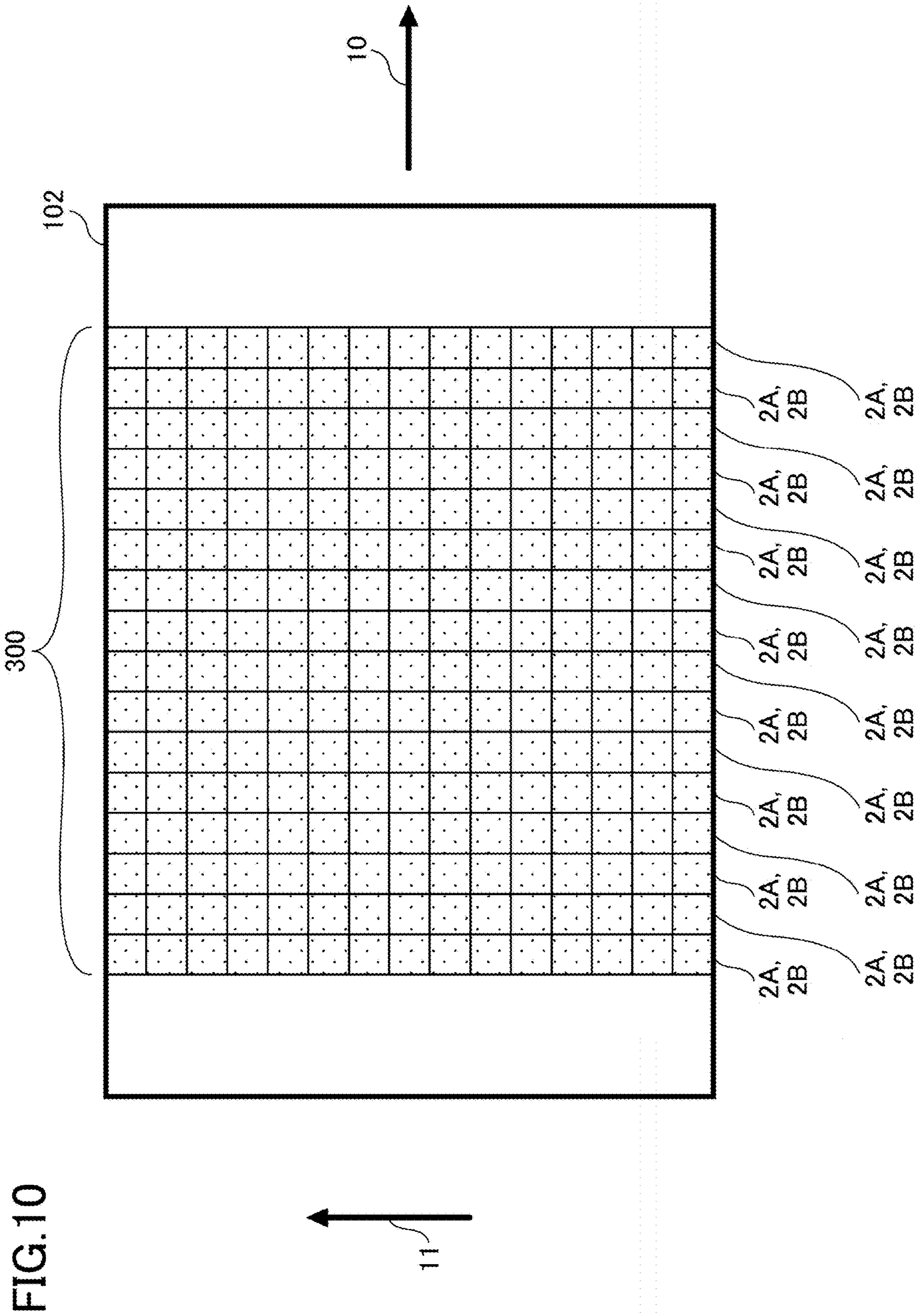
FIG. 10 is a drawing illustrating a film formed by the film forming apparatus according to Comparative Example 2.

Continuous film formation was performed under the same conditions as the formation conditions of Example 1 except for the fact that only two inkjet heads were used among the four inkjet heads 103A, 103B, 103C, and 103D arranged in the conveyance direction, ink was applied on top of one another by the two inkjet heads, to each of the regions of the target coating material as illustrated in FIG. 10, and the droplet size of the respective ink heads was changed from 14 [p1] to 7 [p1].

Reference Example 1

Continuous film formation was performed under the same conditions as the formation conditions of Example 1 except for the fact that the target coating material was changed to a PET resin film having a thickness of 50 μm.

Reference Example 2

Continuous film formation was performed under the same conditions as the formation conditions of Example 1 except for the fact the ink used was changed from the ink 1 to ink 4.

Reference Example 3

Continuous film formation was performed under the same conditions as the formation conditions of Example 1 except for the fact the ink used was changed from the ink 1 to ink 5.

Reference Example 4

Each of the inks were added to the ink storage container in a modified version of an inkjet recording apparatus (product name: VC-60000; Ricoh Co., Ltd.) capable of being loaded with four types of inks, and then film was formed. The configuration of the modified version on the inkjet recording apparatus is a configuration having the configuration illustrated in FIG. 1 and also having five LED-UV lamp units arranged between the inkjet heads and the heat drum. Continuous film formation was performed using this modified version of the inkjet recording apparatus under the same conditions as the formation conditions of Comparative example 1 except for the fact that the ink 1 was changed to ink 6. The evaluation results of Examples 1 to 12, Comparative examples 1 to 2, and Reference examples 1 to 4 are illustrated in Table 1.

TABLE 1

| | Film Quality |
|---|---|
| Example 1 | 4 |
| Example 2 | 4 |
| Example 3 | 3 |
| Example 4 | 3 |
| Example 5 | 3 |
| Example 6 | 3 |
| Example 7 | 4 |
| Example 8 | 4 |
| Example 8 | 3 |
| Example 10 | 5 |
| Example 11 | 5 |
| Example 12 | 4 |
| Comparative Example 1 | 1 |
| Comparative Example 2 | 2 |
| Reference Example 1 | 3 |
| Reference Example 2 | 3 |
| Reference Example 3 | 4 |
| Reference Example 4 | 4 |

The evaluation results of the evaluations performed for Examples 1 to 12, Comparative examples 1 to 2, and Reference examples 1 to 4 are illustrated in Table 1. As illustrated in Table 1, excellent film quality can be obtained by the present embodiment. Also, in Reference example 1, a resin film was used instead of the target coating material of the Comparative example 1 having a layer whose main component is particles, and the quality of the film is excellent in comparison with the target coating material having particles as the main component. It was learned from this that the present embodiment is particularly effective when a target coating material having a layer whose main component is particles is used.

The ink of the Reference examples 2 and 3 with few non-volatile components in the ink, i.e., 20% and 10% non-volatile components respectively per unit volume, compared with the 40% of non-volatile components per unit volume in the ink the Comparative example 1, obtain excellent film quality. It was learned from this that the present embodiment is particularly effective when ink with many non-volatile components included therein is used.

In other words, it was learned that it is favorable to apply ink containing non-volatile components greater than or equal to 30% per unit volume in a case where ink is to be applied onto a layer provided, on a non-permeable substrate, whose main component is particles. It is to be noted that the non-volatile components are applied onto the layer provided on the non-permeable substrate, without penetrating into the layer provided on the non-permeable, substrate or replacing the air inside the layer. However, there are also cases where a portion of the non-volatile components penetrate into the layer or replace the air inside the layer.

The film quality of the ink of the Reference example 4 is ink without any metal oxide particles used therein, the ink having been changed to ink that contains an acrylic monomer instead of the metal oxide which is the main component in the ink of the Comparison example 1. It is expected that this excellent film quality is derived from the fact that replacement of air within the topmost layer is readily promoted because the acrylic monomer is superior to metal oxide with respect to the penetration into the topmost layer, of the target coating material, whose main component is particles. From this, it was learned that the present embodiment is particularly effective in a case where ink including metal oxide is used. In other words, it was learned that the non-volatile components contained in ink is favorable when metal oxide particles are included.

As per the evaluation results of Examples 7 to 9, a film quality of 3 was given for 0.2 sec and a film quality of 4 was given for 0.3 sec and 0.4 secs regarding the ink application time difference between the respective inkjet heads 103A, 103B, 103C, and 103D. Accordingly, it was learned that a time difference of 0.3 sec or more is favorable.

In other words, the inkjet heads 103A, 103B, 103C, and 103D include a first discharge head and a second discharge head, the second discharge head being provided downstream with respect to the first discharge head in the conveyance direction 10. It was also learned that it is favorable for the second discharge head to apply ink onto the target coating material 102 0.3 seconds or more after the point in time at which the first discharge head applies ink to the target coating material 102.

In this case, the distance between the centers of two neighboring ink droplets that have impacted the target coating material 102 in the conveyance direction of the target coating material 102 is equal to or greater than a value obtained by multiplying the conveyance speed of the target coating material 102 by 0.3 sec. In other words, the film forming apparatus 100 applies ink from each of the inkjet heads 103A, 103B, 103C, and 103D to a different location on the target coating material 102 in the conveyance direction 10, locations being apart by the distance equal to or greater than the value obtained by multiplying the conveyance speed of the target coating material 102 by 0.3 sec.

Also, as per the evaluation results of Example 10, it was learned that it is favorable for inkjet heads among the inkjet heads 103A, 103B, 103C, and 103D provided closer to the downstream side in the conveyance direction 10 to discharge larger droplets.

As per the above-described results, it was learned that the present embodiment can obtain excellent film quality. Also, it was learned that excellent film quality can be obtained in a case where at least a substrate of an electrode application for a battery is serving as the target coating material.

The electrode for a battery includes a positive electrode including a positive current collector and a positive active material layer and includes a negative electrode including a negative current collector and a negative active material layer. The film forming apparatus 100 is favorable for applications such as the forming of an insulating film wherein the positive electrode and the negative electrode in the electrode for a battery are insulated from each other.

Actions and Effects of Film Forming Method by the Film Forming Apparatus 100

Next, the actions and effects of the film forming method by the film forming apparatus 100 is described.

When ink (liquid) is applied to the target coating material 102 in which a layer whose main component is particles is provided on the topmost layer of the non-permeable substrate, substantially round defects where ink is absent on the target coating material 102 tend to occur, compared to a structure on which a layer whose main constituent is resin is provided.

It is thought that this phenomenon occurs in the case where ink is applied on the target coating material 102, in order to interfere with spreading of ink on the target coating material 102 when air inside the layer with particles as the main component in the target coating material 102 is replaced by liquid and in turn discharged from the layer. When the target coating material 102 in which substantially round defects exist is used as the electrode, this can cause a short circuit.

In the present embodiment, a coating step is performed in which ink is discharged onto the target coating material 102 from each of the inkjet heads 103A, 103B, 103C, and 103D (plurality of discharge heads) arranged in the conveyance direction 10 in which the target coating material 102 is to be conveyed. Moreover, in the coating step, the ink discharged from each of the inkjet heads 103A, 103B, 103C, and 103D is applied to a different location on the target coating material 102 in the conveyance direction 10.

By doing so, ink can be applied intermittently to the target coating material 102 with a constant time between applications rather than being applied continuously, thereby ensuring sufficient time for the air within the layer with particles as the main component to be replaced by ink, and in turn discharged therefrom. As a result, the ink spreads on the target coating material 102 sufficiently covering the target coating material, and thus defects such as substantially round defects in the target coating material 102 are unlikely to occur, thereby improving uniformity of the film that is formed.

Also, the present embodiment, area of the respective regions on the target coating material 102 in which the inkjet heads 103A, 103B, 103C, and 103D dispose ink is uniform. By making the area uniform, the thickness of the film that is formed by application of ink from the respective inkjet heads becomes uniform, and thus uniformity of the film thickness can be improved.

It is to be noted that the areas of the film to be formed by application of the ink from the respective inkjet heads do not have to be exactly the same. For example, the aforementioned effects can be obtained even if there is a difference of 5% or less with respect to a desired area.

In the present embodiment, although the above illustrates a configuration in which ink is applied onto a layer having particles as the main component on the topmost layer of the target coating material 102, the configuration is not limited thereto. Even if the target coating material 102 is not provided with a layer having particles as the main component, as the structure includes air inside, the aforementioned actions and effects can be obtained by applying the present embodiment.

The film forming apparatus and the film forming method are not limited to the specific embodiments described in the detailed description, and variations and modifications may be made without departing from the spirit and scope of the present invention.

In the aforementioned embodiments, although a configuration in which a film is uniformly formed on a target coating material is provided as an example, ink can also be discharged by the inkjet heads to form a predetermined pattern on the target coating material. This pattern includes an identification code such as a two-dimensional code or a barcode indicative of information of, for example, a target coating material; an electrode to be manufactured by application of ink onto the target coating material; or the like. By doing so, the imparting of information for a target coating material that is the target of formation; an electrode that is to be manufactured; or the like can be performed efficiently without performing another step.

Further, the values such as the ordinal numbers, quantities, or the like used in the description of the embodiments are all exemplified for the purpose of illustrating the technology of the present invention, and the present invention is not limited to the exemplary values.

REFERENCE SIGNS LIST

10 Conveyance direction
11 Widthwise direction
100 Film forming apparatus
101 Unwinder
102 Target coating material
103, 103A, 103B, 103C, 103D Inkjet head
104 Platen
105 Heat drum
106 Air dryer
107 Conveyance roller
108 Winder
300 Film
dx, dy Distance
2A, 2B, 2C, 2D Region

What is claimed is:

1. A film forming method for forming a film on a target coating material, the method comprising:

coating a target coating material, to form the film, by discharging liquid intermittently at constant intervals from a plurality of discharge heads that are arranged in a conveyance direction of the target coating material to be conveyed, the plurality of discharge heads discharging the liquid sequentially in an order of the plurality of discharge heads arranged in the conveyance direction, an area of a region of the target coating material where each of the plurality of discharge heads discharge the liquid is equal in size, wherein one head of the plurality of discharge heads applies ink to form a first linear region in a direction perpendicular to the conveyance direction in the film, wherein another head, different from the one head, of the plurality of discharge heads applies the ink to form a second linear region perpendicular to the conveyance direction in the film, the second linear region located at a different position on the target coating material in the conveyance direction from the first linear region, wherein the target coating material includes a current collector with an active material layer formed on the current collector, the active material layer having particles as a main component, and the film as a layer is disposed on the active material layer, wherein a first discharge head and a second discharge head are included among the plurality of discharge heads, the second discharge head being provided downstream with respect to the first discharge head in the conveyance direction, wherein the second discharge head applies liquid onto the target coating material 0.3 seconds or more after a point in time at which the first discharge head applies liquid onto the target coating material, resulting in generation of two neighboring ink droplets that have impacted the target coating material in the conveyance direction of the target coating material, wherein the current collector is a non-permeable substrate, and wherein a distance between centers of the two neighboring ink droplets is greater than a value obtained by multiplying a conveyance speed of the target coating material by 0.3 sec.

2. The film forming method according to claim 1, wherein areas of the target coating material in which the liquid discharged from each of the plurality of discharge heads is applied are substantially uniform.

3. The film forming method according to claim 1, wherein the closer a discharge head is, among the plurality of discharge heads, to a downstream side in the conveyance direction, the greater a discharged droplet is in size.

4. The film forming method according to claim 1, the liquid discharged contains metal oxide particles at a content of greater than or equal to 30% per unit volume, the liquid being discharged on the active material layer having the particles as the main component, the layer being provided on a non-permeable substrate of the target coating material.

5. The film forming method according to claim 1, wherein each of the plurality of discharge heads include a plurality of nozzles arranged in a direction intersecting the conveyance direction, the nozzles discharging the liquid.

6. The film forming method according to claim 1, wherein the target coating material includes an electrode, and wherein, the liquid discharged from each of the plurality of discharge heads is applied to a different location on the electrode in the conveyance direction.

7. The film forming method according to claim 1, wherein the first linear region is formed along an entire width of the target coating material in the direction perpendicular to the conveyance direction; and the second linear region is formed along the entire width of the target coating material in the direction perpendicular to the conveyance direction.

8. The film forming method according to claim 1, wherein the film is an insulating film.

9. The film forming method according to claim 8, wherein the insulating film physically insulates the positive electrode from the negative electrode.

* * * * *